(12) United States Patent
Arita

(10) Patent No.: US 11,505,915 B2
(45) Date of Patent: Nov. 22, 2022

(54) UNDERGROUND MEASURING APPARATUS

(71) Applicant: JAPAN AVIATION ELECTRONICS INDUSTRY, LIMITED, Tokyo (JP)

(72) Inventor: Hiroshi Arita, Irvine, CA (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 262 days.

(21) Appl. No.: 16/720,584

(22) Filed: Dec. 19, 2019

(65) Prior Publication Data

US 2021/0087787 A1 Mar. 25, 2021

Related U.S. Application Data

(60) Provisional application No. 62/905,595, filed on Sep. 25, 2019.

(51) Int. Cl.
*E02F 5/14* (2006.01)
*E21B 47/0228* (2012.01)
*G01V 3/26* (2006.01)

(52) U.S. Cl.
CPC ............ *E02F 5/14* (2013.01); *E21B 47/0228* (2020.05); *G01V 3/26* (2013.01)

(58) Field of Classification Search
None
See application file for complete search history.

(56) References Cited

U.S. PATENT DOCUMENTS 3,695,112 A * 10/1972 Possell ..................... G01K 7/20
374/173
3,987,667 A * 10/1976 Rasmussen ........... E21F 17/185
346/79

(Continued)

FOREIGN PATENT DOCUMENTS

WO 2015111713 A1 7/2015
WO WO-2016130804 A1 * 8/2016

OTHER PUBLICATIONS

Arita et al., "Development of Digital Directional Module", JAE Technical Report No. 39, Mar. 1, 2017, PP. pp.40-47.

(Continued)

*Primary Examiner* — Raul J Rios Russo
*Assistant Examiner* — Carl F.R. Tchatchouang
(74) *Attorney, Agent, or Firm* — Greenblum & Bernstein, P.L.C.

(57) ABSTRACT

The present invention is aimed to reduce power consumption of a measuring apparatus. A measuring apparatus according to the present invention is to be disposed in an excavation section of an underground excavator. The measuring apparatus according to the present invention includes a first measurement module, a second measurement module, and an information processor. The first measurement module includes a triaxial first accelerometer and a triaxial first magnetometer for performing highly-accurate measurement. The second measurement module includes a triaxial second accelerometer and a triaxial second magnetometer for performing measurement during excavation. The information processor controls the first measurement module and the second measurement module and obtains a position and an attitude of the excavation section based on output data of the first measurement module or the second measurement module. Further, the second accelerometer and the second magnetometer are MEMS sensors.

3 Claims, 4 Drawing Sheets

(56) References Cited

U.S. PATENT DOCUMENTS

| | | | | |
|---|---|---|---|---|
| 5,585,726 A * | 12/1996 | Chau | ............. | G01V 3/26 |
| | | | | 175/45 |
| 6,315,062 B1 * | 11/2001 | Alft | ............. | E21B 47/022 |
| | | | | 175/45 |
| 9,976,410 B2 | 5/2018 | Mizunaga et al. | | |
| 10,465,509 B2 * | 11/2019 | Yao | ............. | G01V 1/50 |
| 2010/0100329 A1 * | 4/2010 | Ekseth | ............. | E21B 47/022 |
| | | | | 175/45 |
| 2014/0318236 A1 * | 10/2014 | Lingle | ............. | G01F 23/26 |
| | | | | 73/290 R |
| 2016/0281331 A1 * | 9/2016 | Ikegami | ............. | E02F 3/32 |
| 2017/0002648 A1 * | 1/2017 | Mizunaga | ............. | E21B 47/024 |
| 2019/0169979 A1 * | 6/2019 | Nguyen | ............. | E21B 47/022 |

OTHER PUBLICATIONS

First Office Action from European Patent Office in Corresponding Application No. 20192379.4 dated Dec. 2, 2021.

Extended European Search Report issued in European Patent Office (EPO) Counterpart Patent Appl. No. 20192379.4, dated Feb. 19, 2021.

* cited by examiner

UNDERGROUND MEASURING APPARATUS

CLAIM FOR PRIORITY

This application claims the priority benefit of U.S. provisional application 62/905,595, filed Sep. 25, 2019, the contents of which is expressly incorporated by reference herein in its entirety.

BACKGROUND OF THE INVENTION

The present invention relates to a measuring apparatus that is disposed in an excavation section of an underground excavator and is used for measuring an excavation position.

As related art of a measuring apparatus that is disposed in an excavation section of an underground excavator, there are known a measuring apparatus that is described in International Publication No. WO2015/111713 (hereinafter referred to as Patent Literature 1) and a measuring apparatus that is described in Hiroshi Arita, Takazumi Yamada, Yusuke Inoue, "Development of Digital Directional Module", JAE Technical Report, No. 39, 2017.3., Internet <https://www.jae.com/corporate/rd/tech-report/39/> (hereinafter referred to as Non-patent Literature 1), for example. Both of the measuring apparatuses include a triaxial accelerometer, a triaxial magnetometer, and an information processor. FIG. 1 shows a processing flow illustrated in FIG. 5 of Patent Literature 1. FIG. 2 shows the configuration of the measuring apparatus illustrated in FIG. 1 of Non-patent Literature 1. In Patent Literature 1, measurement is performed every time excavation for one rod is ended. That is, a position of a front end of the excavation section is obtained during suspension of excavation. On the other hand, Non-patent Literature 1 describes that the measuring apparatus is capable of performing measurement not only during suspension of excavation but also during excavation. Non-patent Literature 1 describes that "vibration" and "rotation" generated by excavation are simultaneously applied to the whole of an underground excavator in practical excavation environments and provides the description of a method for calculating an inclination angle and an azimuth angle while eliminating influences of "vibration" and "rotation". Specifically, state quantities such as an inclination angle and an azimuth angle are accurately calculated by employing an unscented Kalman filter having high resistance against disturbance and repeating an estimation process and a correction process for every time step. In the estimation process, a state quantity at current time is estimated by applying a physical model, which is obtained in consideration of vibration and rotation of a tool in excavation, to a state quantity of one step before. In the correction process, correction is performed so that an influence of disturbance noise is minimized, by using data of the accelerometer and the magnetometer obtained at current time, with respect to an estimated value.

SUMMARY OF THE INVENTION

Non-patent Literature 1 describes that measurement can be also performed during excavation, meaning that electric power is also consumed during excavation. An object of the present invention is to reduce power consumption of a measuring apparatus.

A measuring apparatus according to the present invention is to be disposed in an excavation section of an underground excavator. The measuring apparatus according to the present invention includes a first measurement module, a second measurement module, and an information processor. The first measurement module includes a triaxial first accelerometer and a triaxial first magnetometer for performing highly-accurate measurement. The second measurement module includes a triaxial second accelerometer and a triaxial second magnetometer for performing measurement during excavation. The information processor controls the first measurement module and the second measurement module and obtains a position and a direction of the excavation section based on output data of the first measurement module or the second measurement module. Further, the second accelerometer and the second magnetometer are MEMS sensors.

EFFECT OF THE INVENTION

According to the measuring apparatus of the present invention, a MEMS sensor consuming less power is used during excavation, being able to reduce power consumption of the measuring apparatus.

DESCRIPTION OF EMBODIMENTS

First Embodiment

Figure 1:
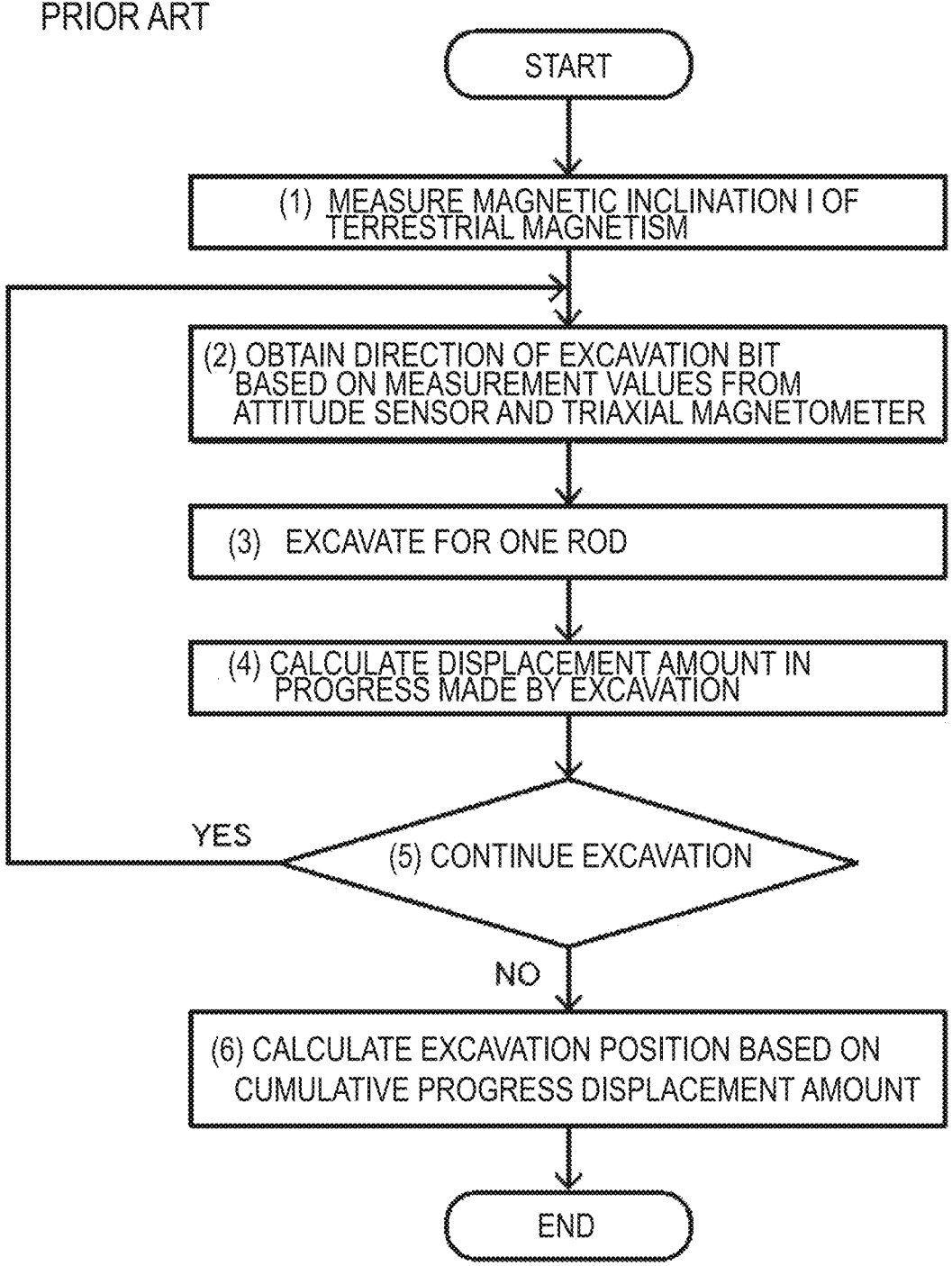
FIG. 1 shows a measurement processing flow in suspension of excavation illustrated in FIG. 5 of Patent Literature 1.
Figure 2:
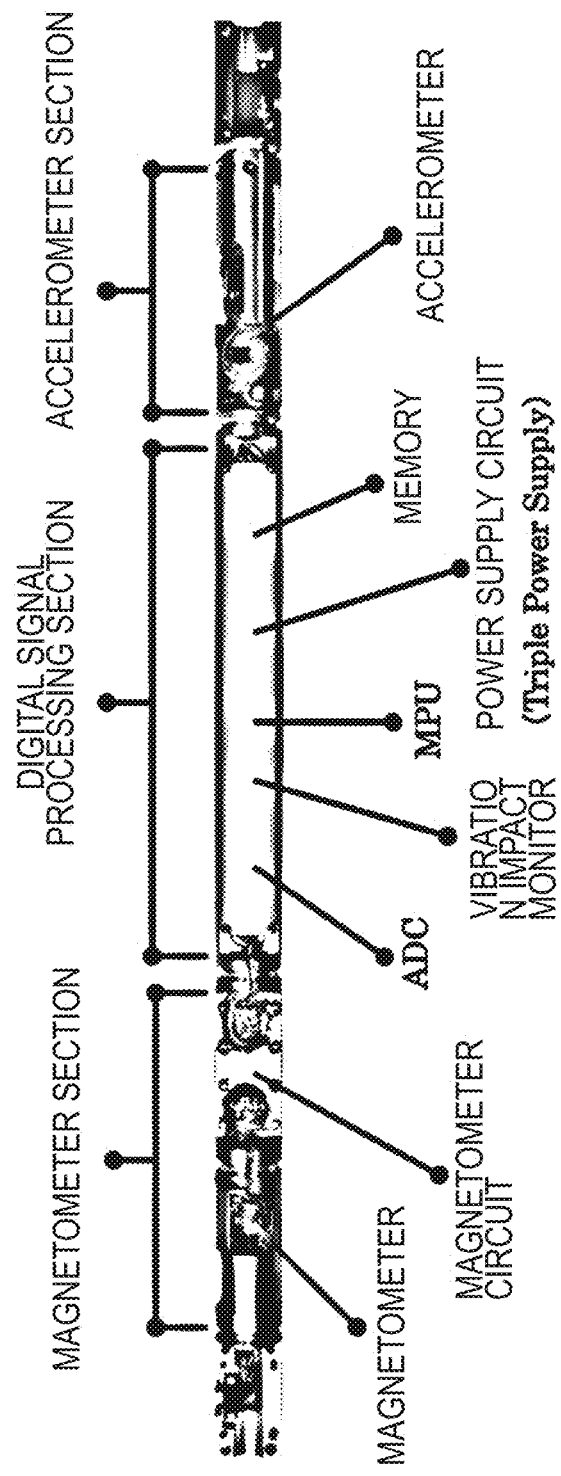
FIG. 2 shows the configuration of the measuring apparatus illustrated in FIG. 1 of Non-patent Literature 1.
Figure 3:
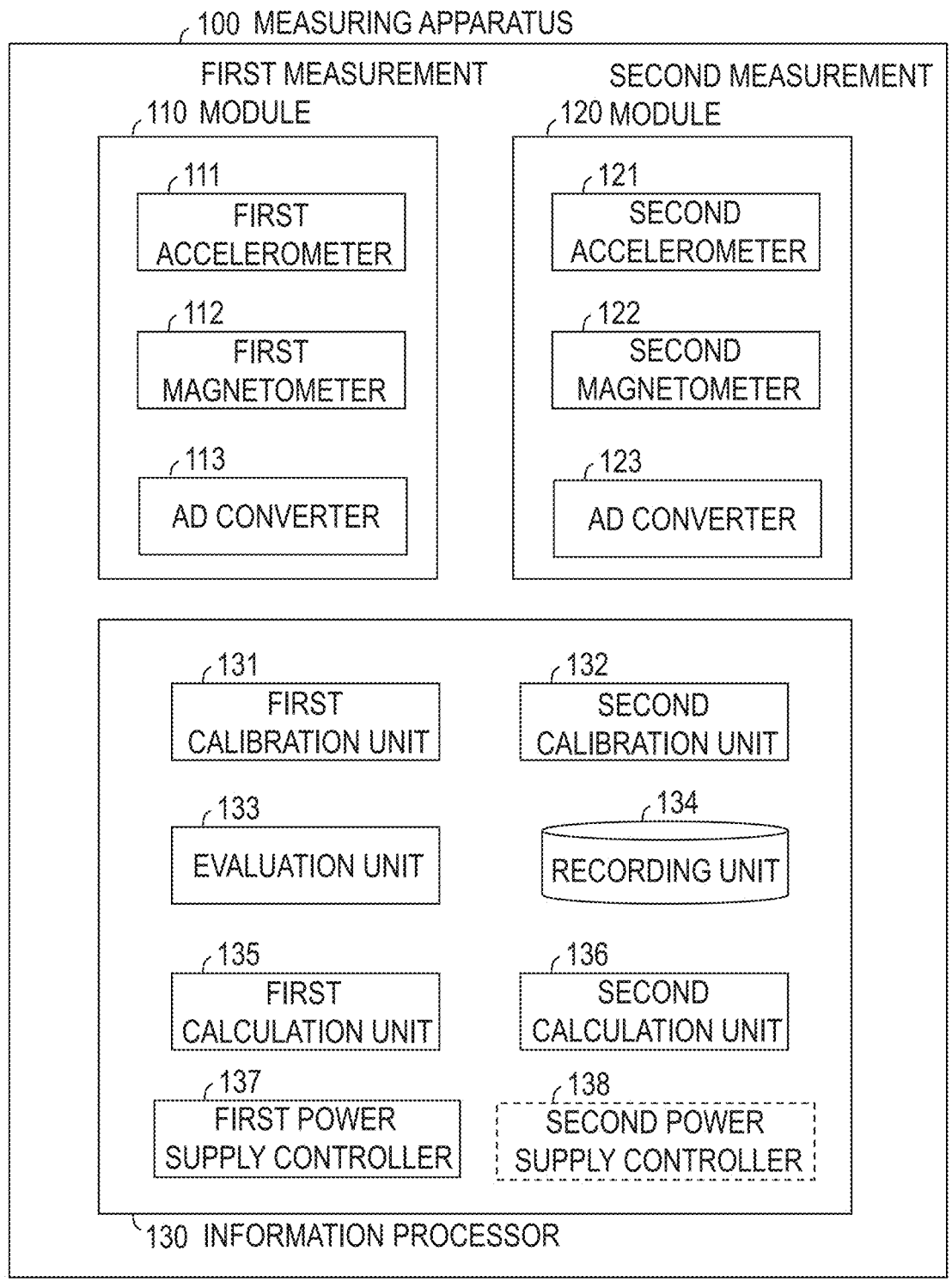
FIG. 3 illustrates a functional configuration of a measuring apparatus according to the present invention.
Figure 4:
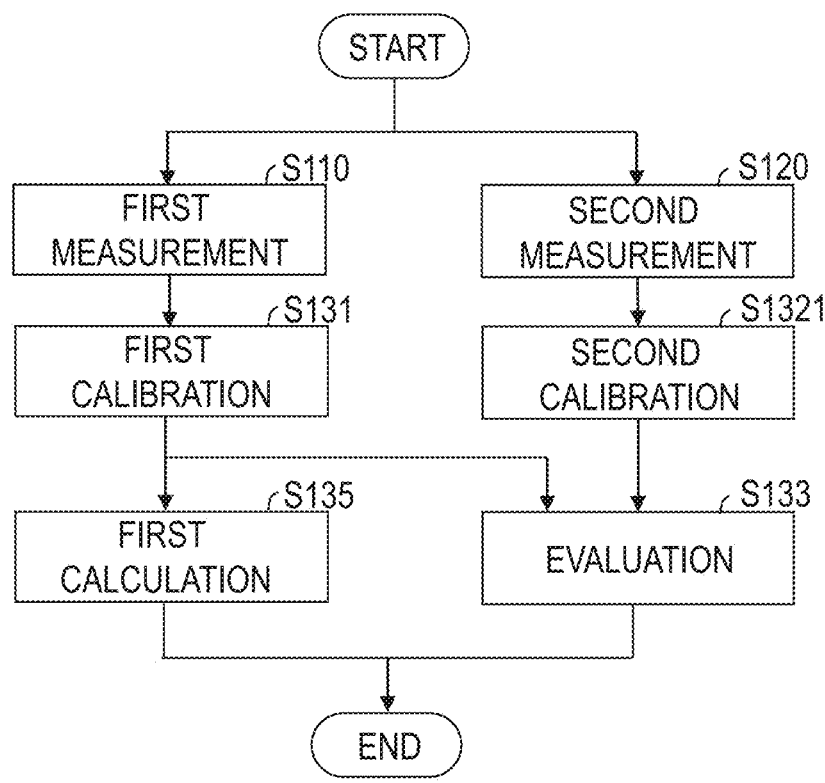
FIG. 4 illustrates a flow of processing for obtaining a position and an attitude of an excavation section based on output data of a first measurement module and evaluating calibration data for a second measurement module.
Figure 5:
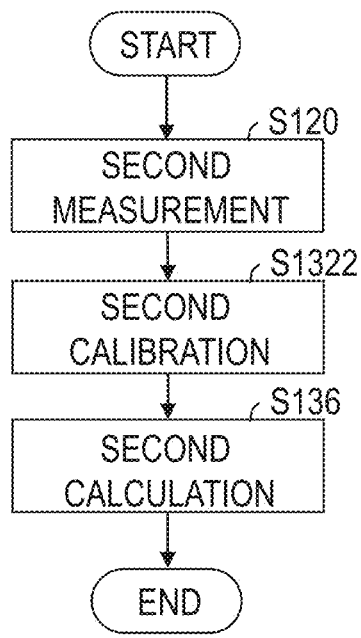
FIG. 5 illustrates a flow of processing for obtaining a position and an attitude of the excavation section based on output data of the second measurement module.

FIG. 3 illustrates a functional configuration of a measuring apparatus according to the present invention. FIG. 4 illustrates a flow of processing for obtaining a position and an attitude of an excavation section based on output data of a first measurement module and evaluating calibration data for a second measurement module. FIG. 5 illustrates a flow of processing for obtaining a position and an attitude of the excavation section based on output data of the second measurement module.

A measuring apparatus 100 is a measuring apparatus that is to be disposed in an excavation section of an underground excavator. The measuring apparatus 100 includes a first measurement module 110, a second measurement module 120, and an information processor 130. The measuring apparatus 100 may be configured to be supplied with power from a battery (not shown) disposed in an excavation section. The first measurement module 110 includes a triaxial first accelerometer 111, a triaxial first magnetometer 112, and an AD converter 113 for performing highly-accurate measurement. The first accelerometer 111 measures accelerations in predetermined X-, Y-, and Z-axis directions. The first magnetometer 112 measures terrestrial magnetism in the predetermined X-, Y-, and Z-axis directions. The AD converter 113 AD-converts output of the first accelerometer 111 and the first magnetometer 112 so as to obtain output data of digital signals. Here, the AD converter 113 may be disposed in the outside of the first measurement module 110. Specifically, highly-accurate measurement can be realized by using the accelerometer and the magnetometer which are described in Non-patent Literature 1. However, if the accelerometer and the magnetometer described in Non-patent Literature 1 are kept to be also used during excavation, power consumption is increased, causing frequent exchange of a battery disposed in the excavation section. Further, though the accelerometer and the magnetometer described in Non-patent Literature 1 are capable of performing highly-accurate measurement, dynamic ranges are narrow. Consequently, if the measuring apparatus is strongly influenced by vibration, impact, and rotation generated by excavation, measurement values thereof may be disadvantageously saturated.

The second measurement module 120 includes a triaxial second accelerometer 121, a triaxial second magnetometer 122, and an AD converter 123 for performing measurement during excavation. The second accelerometer 121 and the second magnetometer 122 are sensors of micro electro mechanical systems (MEMS) type. The second accelerometer 121 measures accelerations in predetermined X-, Y-, and Z-axis directions. The second magnetometer 122 measures terrestrial magnetism in the predetermined X-, Y-, and Z-axis directions. The AD converter 123 AD-converts output of the second accelerometer 121 and the second magnetometer 122 so as to obtain output data of digital signals. Here, the AD converter 123 may be disposed in the outside of the second measurement module 120. Further, the second measurement module 120 may include another sensor of the MEMS type as well as the second accelerometer 121 and the second magnetometer 122.

The information processor 130 controls the first measurement module 110 and the second measurement module 120 and obtains a position and an attitude of the excavation section based on output data of the first measurement module 110 or the second measurement module 120. The information processor 130 includes a first calibration unit 131, a second calibration unit 132, an evaluation unit 133, a recording unit 134, a first calculation unit 135, a second calculation unit 136, and a first power supply controller 137, for example. The recording unit 134 preliminarily records calibration data for calibrating the first accelerometer 111, the first magnetometer 112, the second accelerometer 121, and the second magnetometer 122. Calibration data may be recorded in the recording unit 134 in a factory before shipping.

Referring to FIG. 4, a flow of processing for obtaining a position and an attitude of the excavation section based on output data of the first measurement module 110 and evaluating calibration data for the second measurement module 120 is first explained. The first accelerometer 111 measures accelerations in the predetermined X-, Y-, and Z-axis directions and the first magnetometer 112 measures terrestrial magnetism in the predetermined X-, Y-, and Z-axis directions (S110). Then, the measured results are digitalized and inputted into the information processor 130 as output data of the first measurement module 110. The second accelerometer 121 measures accelerations in the predetermined X-, Y-, and Z-axis directions and the second magnetometer 122 measures terrestrial magnetism in the predetermined X-, Y-, and Z-axis directions (S120). Then, the measured results are digitalized and inputted into the information processor 130 as output data of the second measurement module 120.

The first calibration unit 131 calibrates the output data of the first measurement module 110 based on calibration data recorded in the recording unit 134 (S131). The second calibration unit 132 calibrates the output data of the second measurement module 120 based on calibration data recorded in the recording unit 134 (S1321). Here, the first calibration unit 131 and the second calibration unit 132 may also acquire data related to surrounding conditions such as temperature data from a temperature sensor (not shown) or the like provided to the excavation section and may use the data for calibration.

The evaluation unit 133 compares the output data of the first measurement module 110 calibrated in step S131 with the output data of the second measurement module 120 calibrated in step S1321 to obtain an error of the calibrated output data of the second measurement module 120 (S133). That is, the evaluation unit 133 evaluates the calibrated output data of the second measurement module 120. For example, an obtained error may be recorded in the recording unit 134 and correction may be performed in later-described processing for calibrating output data of the second measurement module 120 (S1322) or processing of calculation by the second calculation unit 136 (S136). In this case, the information processor 130 corrects an error of output data of the second measurement module 120 based on output data of the first measurement module 110. Alternatively, calibration data itself recorded in the recording unit 134 may be corrected based on an obtained error, for example. In this case, the information processor 130 corrects calibration data for the second measurement module 120, which is recorded in the recording unit 134, based on output data of the first measurement module 110.

The first calculation unit 135 obtains a position and an attitude of the excavation section based on the output data of the first measurement module 110 calibrated in step S131 (S135). That is, the information processor 130 obtains a position and an attitude of the excavation section based on the output data of the first measurement module 110. When the processing illustrated in FIG. 4 is performed during suspension of excavation, calculation illustrated in Patent Literature 1 may be used, for example. When the processing illustrated in FIG. 4 is performed during excavation, the method which uses an unscented Kalman filter and is described in Non-patent Literature 1 may be employed, for example. However, since the first measurement module 110 is capable of performing highly-accurate measurement, a dynamic range of acceleration is generally narrow. Accordingly, it is suitable to avoid the processing of FIG. 4 when the measuring apparatus is strongly influenced by vibration, impact, and rotation generated by excavation.

Here, the information processor 130 may also include a second power supply controller 138. For example, the second power supply controller 138 may suspend power supply from the battery disposed in the excavation section to the second measurement module 120 so as to turn off power supply of the second measurement module 120 from end of the processing in step S120 to start of the next processing in step S120. This processing can stop power consumption in the second measurement module 120. However, since the second measurement module 120 includes the MEMS type sensors, power consumption thereof is small. Accordingly, the second power supply controller 138 does not have to be provided.

A processing flow during excavation is now explained. The first power supply controller 137 of the information processor 130 suspends power supply from the battery disposed in the excavation section to the first measurement module 110 so as to turn off power supply of the first measurement module 110 before the start of excavation.

This processing can stop power consumption in the first measurement module 110. A flow of processing for obtaining a position and an attitude of the excavation section based on output data of the second measurement module 120 is next explained with reference to FIG. 5. The second accelerometer 121 measures accelerations in the predetermined X-, Y-, and Z-axis directions and the second magnetometer 122 measures terrestrial magnetism in the predetermined X-, Y-, and Z-axis directions (S120). Then, the measured results are digitalized and inputted into the information processor 130 as output data of the second measurement module 120.

The second calibration unit 132 calibrates the output data of the second measurement module 120 based on calibration data recorded in the recording unit 134 (S1322). Here, the second calibration unit 132 may also acquire data related to surrounding conditions such as temperature data from a temperature sensor (not shown) or the like provided to the excavation section and may use the data for calibration. Further, when an error of the output data of the second measurement module 120 is recorded in the recording unit 134, correction of the error may be also performed in the calibration in step S1322.

The second calculation unit 136 obtains a position and an attitude of the excavation section based on the output data of the second measurement module 120 calibrated in step S1322 (S136). That is, the information processor 130 obtains a position and an attitude of the excavation section based on the output data of the second measurement module 120. In the calculation in step S136, the method which uses an unscented Kalman filter and is described in Non-patent Literature 1 may be employed. Further, when an error of the output data of the second measurement module 120 is recorded in the recording unit 134 and the error is not used in step S1322, the calibrated output data obtained in step S1322 may be corrected in the calculation.

The second accelerometer 121 and the second magnetometer 122 of the second measurement module 120 are MEMS sensors, thereby consuming less power. Accordingly, power consumption during excavation can be reduced. Excavation suspension time is approximately 1 minute with respect to excavation time 30 to 60 minutes, in general, so that the whole power consumption can be reduced by lowering power consumption during the excavation. An exchange interval for a battery disposed in the excavation section can be accordingly prolonged. Further, though measurement accuracy of the second accelerometer 121 and the second magnetometer 122 of the second measurement module 120 is lower than that of the first accelerometer 111 and the first magnetometer 112 of the first measurement module 110, dynamic ranges can be widened. That is, the risk of saturation in measurement values is low even if the measuring apparatus 100 is influenced by vibration, impact, and rotation during excavation. Accordingly, a position and an attitude of the excavation section can be also grasped even during excavation.

What is claimed is:

1. A measuring apparatus that is to be disposed in an excavation section of an underground excavator and supplied with power from a battery disposed in the excavation section, the measuring apparatus comprising:
   a first measurement module that includes a triaxial first accelerometer and a triaxial first magnetometer for performing highly-accurate measurement;
   a second measurement module that includes a triaxial second accelerometer and a triaxial second magnetometer for performing measurement during excavation; and
   an information processor that controls the first measurement module and the second measurement module, obtains a position and an attitude of the excavation section based on output data of the first measurement module or the second measurement module, and has a function of turning off power supply of the first measurement module while maintaining power supply of the second measurement module, wherein
   the second accelerometer and the second magnetometer are MEMS sensors; and
   the information processor turns off power supply of the first measurement module before the start of excavation.

2. The measuring apparatus according to claim 1, wherein the information processor corrects an error of output data of the second measurement module based on output data of the first measurement module.

3. The measuring apparatus according to claim 1, wherein the information processor corrects calibration data for the second measurement module based on output data of the first measurement module.

* * * * *